(12) United States Patent
Gimpel et al.

(10) Patent No.: US 10,948,574 B2
(45) Date of Patent: Mar. 16, 2021

(54) OPTOELECTRONIC SENSOR AND METHOD FOR DETECTING AN OBJECT

(71) Applicant: SICK AG, Waldkirch (DE)

(72) Inventors: Hartmut Gimpel, Waldkirch (DE); Roger Buser, Waldkirch (DE)

(73) Assignee: SICK AG, Waldkirch (DE)

( * ) Notice: Subject to any disclaimer, the term of this patent is extended or adjusted under 35 U.S.C. 154(b) by 438 days.

(21) Appl. No.: 15/948,022

(22) Filed: Apr. 9, 2018

(65) Prior Publication Data
US 2018/0292512 A1    Oct. 11, 2018

(30) Foreign Application Priority Data
Apr. 10, 2017 (DE) .................. 10 2017 107 666.2

(51) Int. Cl.
| | | |
|---|---|---|
| G01C 3/06 | (2006.01) | |
| G01S 7/484 | (2006.01) | |
| G01S 7/481 | (2006.01) | |
| G01S 7/4865 | (2020.01) | |
| G01S 17/10 | (2020.01) | |
| G01S 17/48 | (2006.01) | |
| G01S 17/42 | (2006.01) | |

(52) U.S. Cl.
CPC ............ *G01S 7/484* (2013.01); *G01S 7/4815* (2013.01); *G01S 7/4817* (2013.01); *G01S 7/4865* (2013.01); *G01S 17/10* (2013.01); *G01S 17/42* (2013.01); *G01S 17/48* (2013.01)

(58) Field of Classification Search
CPC .......... G01S 17/10; G01S 17/48; G01S 17/42; G01S 7/4815; G01S 7/484; G01S 7/4817; G01S 7/4865

USPC ....................................................... 356/4.01
See application file for complete search history.

(56) References Cited

U.S. PATENT DOCUMENTS

| | | | |
|---|---|---|---|
| 4,656,462 A | | 4/1987 | Araki et al. |
| 2006/0227317 A1* | | 10/2006 | Henderson .............. G01S 17/89 356/28 |

FOREIGN PATENT DOCUMENTS

| | | |
|---|---|---|
| DE | 19721105 A1 | 11/1998 |
| DE | 102004014041 A1 | 10/2005 |

(Continued)

OTHER PUBLICATIONS

Search Report dated Jan. 30, 2018 issued in corresponding European Application No. 102017107666.2.

*Primary Examiner* — Mark Hellner
(74) *Attorney, Agent, or Firm* — Nath, Goldberg & Meyer; Jerald L. Meyer

(57) ABSTRACT

An optoelectronic sensor (10) for detecting an object in a monitored zone (20) that has at least one light transmitter (22) for transmitting a plurality of mutually separated transmitted light beams (26*a-d*); a plurality of light receivers (34*a-d*) that are each associated with one of the transmitted light beams (26*a-d*) for generating a received signal from the associated light beam (26, 30) remitted at the object; and an evaluation unit (46) that is configured to acquire information on the object at the respective point of incidence of the transmitted light beam (26*a-d*) from the received signal of the light receiver (34*a-d*) that is associated with the transmitted light beam (26*a-d*) and to additionally consider at least one received signal of a light receiver (34*a-b*) that is not associated with the transmitted light beam (26*a-d*) on the acquiring of information on the object at the point of incidence of at least one transmitted light beam (26*a-d*).

15 Claims, 4 Drawing Sheets

(56) References Cited

FOREIGN PATENT DOCUMENTS

| | | |
|---|---|---|
| EP | 2348331 A1 | 7/2011 |
| EP | 2933655 B1 | 2/2015 |
| EP | 2998700 B1 | 7/2016 |
| JP | 02008709 A | 12/1990 |
| JP | H04225113 A | 8/1992 |
| JP | H07253460 A | 10/1995 |
| JP | 2001033719 A | 2/2001 |
| JP | 2015203697 A | 11/2015 |

* cited by examiner

OPTOELECTRONIC SENSOR AND METHOD FOR DETECTING AN OBJECT

CROSS-REFERENCE TO RELATED APPLICATION

This application claims the benefit of German Patent Application No. DE 10 2017 107 666.2, filed on Apr. 10, 2017.

BACKGROUND

1. Field

The invention relates to an optoelectronic sensor for detecting an object in a monitored zone that has at least one light transmitter for transmitting a plurality of mutually separated transmitted light beams; a plurality of light receivers that are each associated with one of the transmitted light beams for generating a received signal from the associated light beam remitted at the object; and an evaluation unit that is configured to acquire information on the object at the respective point of incidence of the transmitted light beam from the received signal of the light receiver that is associated with the transmitted light beam. The invention further relates to a method for detecting an object in a monitored zone in which a plurality of mutually separated light beams are transmitted into the monitored zone and the light beams remitted by the object are received in a light receiver respectively associated with the transmitted light beam to generate a respective received signal, and wherein information on the object at the plurality of sites of incidence of the transmitted light beams is acquired from the received signals.

2. Description of the Related Art

Many optoelectronic sensors work in accordance with the scanning principle in which a light beam is transmitted into the monitored zone and the light beam reflected by objects is received again in order then to electronically evaluate the received signal. A possible result of the evaluation is a binary object determination. The time of flight is often measured using a known phase method or pulse method to determine the distance of a sensed object.

To expand the measured zone, the scanning beam can be moved, on the one hand, as is the case in a laser scanner. A light beam generated by a laser there periodically sweeps over the monitored zone with the help of a deflection unit. In addition to the measured distance information, a conclusion is drawn on the angular location of the object from the angular position of the deflection unit and the site of an object in the monitored zone is thus detected in two-dimensional polar coordinates.

Another possibility for extending the measured zone comprises simultaneously detected measured points using a plurality of scanning beams. This can also be combined with a laser scanner that then does not only detect a monitored plane, but also a three-dimensional space via a plurality of monitored planes.

The scanning movement is achieved by a rotating mirror in most laser scanners. Particularly on the use of a plurality of scanning beams, however, it is also known in the prior art to instead have the total measurement head with the light transmitters and light receivers rotate, as is described, for example, in DE 197 57 849 B4.

To generate the plurality of measured points, the light transmitters and light receivers are arranged in an row in the prior art. A row of LEDs is thus provided in U.S. Pat. No. 4,656,462; a laser array is provided in DE 10 2004 014 041 A1 that is imaged onto the environment via an optics. On the one hand, this has construction disadvantages when the light transmitters or light receivers are present as individual electronic components having their own housings. The housing size then limits how close these components can come at a minimum. A dense arrangement would, however, be advantageous on use of a common lens.

In addition, a respective reception element is responsible for one measurement beam. It must be positioned for this purpose such that it still sufficiently detects the weakest light from the maximum measurement distance. The received light spot for measurement objects coming closer becomes larger, with a shading effect at the center with a coaxial design and with a migration toward the side with a biaxial design. More closely disposed objects beneath a minimum distance are therefore no longer detected. This is conventionally compensated by a near region zone of the reception lens that also still deflects the light onto the reception element in the near region. A configuration of a near region zone on a reception lens for a plurality of measurement beams is, however, not easily possible and at least results in higher costs.

In the still unpublished German patent application having the file reference 10 2015 121 839, it is inter alia proposed to generate a two-dimensional grid by especially designed transmission optics and a corresponding row of light transmitters. This is presented as an alternative to an equidistant linear arrangement; i.e. it suggests the conclusion that it is suitable for different applications than a uniform monitoring in a laser scanner. The alternative is not further discussed in any detail in said patent application. Nor is the near region problem addressed.

DE 197 21 105 A1 deals with a background suppressing scanner. A receiver row is arranged in a triangulation arrangement beside the light transmitter. The position of the light spot on the receiver row depends on the distance of the sensed object. The individual reception elements are combined to a near element and a far element and a switching signal is only generated on a presence determination of an object in the near region while objects in the far region are suppressed. The conventional scanner only works with one single measurement beam.

In EP 2 998 700 B1, an electro-optical distance measurement apparatus is described that has at least two reception elements that are each associated with a different distance region to be measured. A reception lens having a special near region zone can admittedly thereby be dispensed with, but this is done at the cost of at least one additional reception element. In addition, there is also only a single measurement beam in EP 2 998 700 B1.

SUMMARY

It is therefore the object of the invention to improve the object detection by a multi-beam optoelectronic sensor.

This object is satisfied by an optoelectronic sensor and by a method for detecting an object in a monitored zone in accordance with the respective independent claim. The sensor in accordance with the invention can be understood as a multi-scanner that transmits a plurality of transmitted light beams by at least one light transmitter. A plurality of light transmitter are therefore present or the light of a light transmitter is split into a plurality of transmitted light beams or a mixture of the two is provided. The transmitted light beams are not to be understood as beams in the sense of geometrical optics within a larger bundle of rays, but rather as mutually separate light beams and thus isolated scanning beams that generate correspondingly isolated, mutually spaced apart light spots in the monitored zone on incidence onto an object. Conversely, a plurality of light receivers are present to receive the light beams after remission at an object in the monitored zone. They can also be a plurality of pixel zones of a linear or matrix receiver. A respective one transmitted light beam and an associated light receiver form their own monitoring beam so that a bundle of monitoring beams arises and in the case of a scan movement a family of monitoring planes.

The invention now starts from the basic idea of also making use of received signals of those light receivers for evaluating a monitoring beam which are not associated with the transmitted light beam. There is therefore at least one transmitted light beam to whose evaluation both the received signal of the associated light receiver and the received signal of an additional light receiver make a contribution. The additional light receiver preferably acts as an additional near region detector for this purpose. Even more preferably, the additional light receiver is simultaneously the associated light receiver of another transmitted light beam. The additional near region detector is then a double function without an additional apparatus effort. The light receivers can thus mutually support one another as near region detectors.

The invention has the advantage that a sensor having a plurality of measurement beams or monitoring beams has an improved near region reception. Exactly as many monitoring beams can be generated as there are light receivers present and an extended near region can nevertheless be detected for at least one of these monitoring beams. In this respect, a special near region zone in the reception optics or reception lens is not necessary. A complex optics design in which the near region zone would possibly have to be obtained through optical losses can therefore be omitted in the same way as an expensive manufacture and adjustment of a complex lens.

The evaluation unit is preferably configured to determine a distance of the object from a time of flight between the transmission of the transmitted light beams and the reception of the remitted light beams. The sensor thereby becomes distance measuring. The distance is determined with spatial resolution at a plurality of scanning points due to the plurality of transmitted light beams, with reports or other common evaluations being conceivable. Alternatively, only the presence of an object is determined and is output as a switching signal, for example.

The sensor is preferably configured as a laser scanner and has a moving deflection unit with whose aid the transmitted light beams are conducted periodically through the monitored zone and thus form a plurality of scanning planes. The transmitted light beams do not have to extend in parallel with one another, but can, for example, form a bundle of beams having a mutual angular distance. Strictly speaking, no scanning planes then arise, but rather envelope surfaces of a cone or sections thereof. This is nevertheless called a scanning plane in a simplified manner here. The deflection unit is preferably configured in the form of a rotatable scanning unit that practically forms a movable measurement head in which at least the light transmitter and possibly also the light receiver and the evaluation unit or parts thereof are accommodated.

The arrangement of the light receivers preferably forms a two-dimensional pattern. The light receivers are consequently not only distributed over an axis, but rather over an area. The diameter of the arrangement of the light receivers can thereby be reduced with the same total number of light receivers, with the customary generalized definition of the diameter as the largest distance between two light receivers. The arrangement becomes more compact and can be combined with a smaller common lens. A two-dimensional arrangement is particularly advantageous if the reception elements are relative large in construction or have a corresponding housing that prevents a dense arrangement in a row.

The transmitted light beams preferably form a two-dimensional pattern in cross-section, in particular the same two-dimensional pattern as the arrangement of the light receivers except for scaling. The cross-section of the transmitted light beams can be understood as a radiation pattern on a sheet of paper that is held perpendicular in the transmitted light beams. In a preferred embodiment of the invention, independently of two-dimensional patterns, each transmitted light beam is generated by its own light transmitter. The two-dimensional pattern of the transmitted light beams then in particular corresponds to the arrangement of the light transmitters in cross-section. The same pattern of light transmitters and light receivers results in a corresponding pattern of the monitoring beams. The wording "the same except for scaling" geometrically means that the two-dimensional patterns at the transmission side and at the reception side are similar to one another, with congruence and thus a scaling factor of one explicitly being possible.

The direction in which the reception elements lie with respect to the arrangement of the transmitted light beams is preferably rotated by an angle. The angle is a degree of freedom that also still remains with the same or geometrically similar two-dimensional patterns. For example, columns in the arrangement of the reception elements can lie in a direct extension of columns in the arrangement of the transmitted light beams. Said angle would then be zero. The angle can be selected differently and which light receivers have a suitable proximity relationship to be able to act as near region detectors can thus be determined.

The two-dimensional pattern of the light receivers and/or the two-dimensional pattern of the transmitted light beams preferably has/have a matrix arrangement. This first means that a matrix is not necessarily produced in totality, for instance because at least one somewhat spaced apart additional monitoring beam is provided above or beside the matrix arrangement to acquire additional information on the monitoring zone from there. The two-dimensional pattern is preferably of matrix shape overall. A different density, for instance more monitoring beams at the center than at the outside, should remain possible, however.

The matrix arrangement is preferably slanted or rotated. This is unusual because the row direction of a matrix is customarily aligned horizontally. In a laser scanner, the relation is the axis of rotation of the periodical movement or the rotational or central scanning plane. The rows and accordingly the columns of the matrix are neither parallel nor perpendicular to the axis of rotation and to the rotational plane in accordance with this embodiment. The consequence is that the light receivers of a row scan different planes.

The matrix arrangement is even more preferably slanted by an angle at which the scanning planes are arranged equidistantly from one another. A scanning is thus also possible with the compact two-dimensional arrangement as on the use of rows. Equidistant first relates to the decisive vertical spacing of the light transmitters or light receivers. The scanning planes do not have to extend in parallel, but can diverge with the distance. In an observation at every fixed distance from the center, the equidistant spacings of the scanning planes from one another remains, however. Certain tolerances are covered by an equidistant arrangement. This at least applies to tolerances that only result in errors in the angular direction that result at typical object distances in a magnitude of the measurement accuracy in the spacing direction. The required angle can be geometrically calculated with a given arrangement. Alternatively, the angle can also be determined experimentally, for instance in that a transmission arrangement using visible light is used that draws a family of parallel lines on a projection surface such as a sheet of paper with a correct angle.

The evaluation unit is preferably configured to activate the light transmitters and light receivers after one another in a multiplex process, with the respectively associated light receiver being active during the transmission of a transmitted light beam and with additionally at least one further light receiver that is not associated with the transmitted light beam being activated for at least one transmitted light beam. A respective separate light transmitter is provided per transmitted light beam, in particular in such an arrangement, since divided light beams are not individually actuable or are only individually actuable with restrictions by optics. The multiplex process actually has two advantages. Driver stages or analog or digital evaluations stations such as amplifiers or filters are provided for the light transmitters and the light receivers. Without multiplexing, such stages would have to be installed for every light transmitter and for every light receiver and the complex circuit structure would be accompanied by a large power consumption. In addition, light receivers can thereby act as additional light receivers for a different light beam than the associated transmitted light beam since there are repeatedly free phases in which the associated transmitted light beam is inactive.

In principle, all the light receivers can also be constantly active to act as additional light receivers for the just active transmitted light beam; however, many of these additional light receivers would then only contribute noise. Nor is it necessary, and is not even sensibly meaningful, to receive all the transmitted light beams by a plurality of light receivers since there are not even any suitably arranged light receivers in the regular arrangement that could generate a near region signal for some monitoring beams. This is no big disadvantage since with near objects the monitoring zones are anyway very dense so that which monitoring beam detects the object does not play a substantial role for the measurement accuracy. The multiplexing is preferably a time multiplexing to profit from the described advantages with respect to circuit stages and power consumption. However, other possibilities are also conceivable, in particular with respect to the near region detection, for instance an amplitude modulation at a different frequency per transmitted light beam and with a separation of the received signals with reference to the frequency by a Fourier analysis or in accordance with the principle of a lock-in amplifier.

The evaluation unit is preferably configured to individually evaluate the received signal of the light receiver associated with the transmitted light beam and the at least one additionally considered received signal to compare or allocate the results or to form a common signal therefrom and to evaluate it. The additional light receiver acts, as addressed a multiple of times, as a near region detector. Consequently, as a rule, depending on the distance of the sensed object, the actually responsible light receiver associated with the transmitted light beam or the additional light receiver will deliver the better result. A decision can therefore take place at the start of the evaluation, for instance with reference to the level, as to which received signal will be further evaluated. In other embodiments, separate evaluations and a comparison or an allocation follow a plane of distances or other evaluation results. It is also conceivable to combine the received signals in their raw form, for example as a sum signal.

The evaluation unit is preferably configured to evaluate the received signal of the light receiver associated with the transmitted light beam and the at least one additionally considered received signal according to the triangulation principle for a distance estimate. The additional light receiver has previously been described as an assisting near region detector. The light receivers involved in the monitoring with a specific transmitted light beam can, however, also be evaluated together in the manner of a triangulation scanner. An evaluation is therefore made as to the light receiver on which a received light spot is registered and an object distance is estimated from this position in accordance with the triangulation principle. This estimate can be relatively rough, for example only near or far in the case of two participating light receivers and becomes finer with the number of participating light receivers. The result can be a separate measurement value or can be used for validation of a measurement value determined using a time of flight process.

A common reception lens is preferably arranged upstream of the light receivers. The reception lens can be part of a more complex reception optics. A common reception lens is also conceivable that is only responsible for a specific part group of the light reception elements. In that the near region is covered by the additional or additionally active light receiver in accordance with the invention, the reception lens can be simple and does not require a near zone even though a near zone is not precluded and can further improve the near region detection and make even closer distances detectable.

At the transmission side, a corresponding common transmission lens or transmission optics is conceivable that is in particular simultaneously configured to split the light of a light transmitter into a plurality of transmitted light beams.

The method in accordance with the invention can be further developed in a similar manner and shows similar advantages in so doing. Such advantageous features are described in an exemplary, but not exclusive manner in the subordinate claims dependent on the independent claims.

The invention will be explained in more detail in the following also with respect to further features and advantages by way of example with reference to embodiments and to the enclosed drawing. The Figures of the drawing show in:

BRIEF DESCRIPTION OF THE DRAWINGS

FIG. 4 a sketch for illustrating the geometrical parameters for the calculation of the required angle of rotation of the rotated matrix of FIG. 2a;

DETAILED DESCRIPTION OF THE PREFERRED EMBODIMENTS

Figure 1:
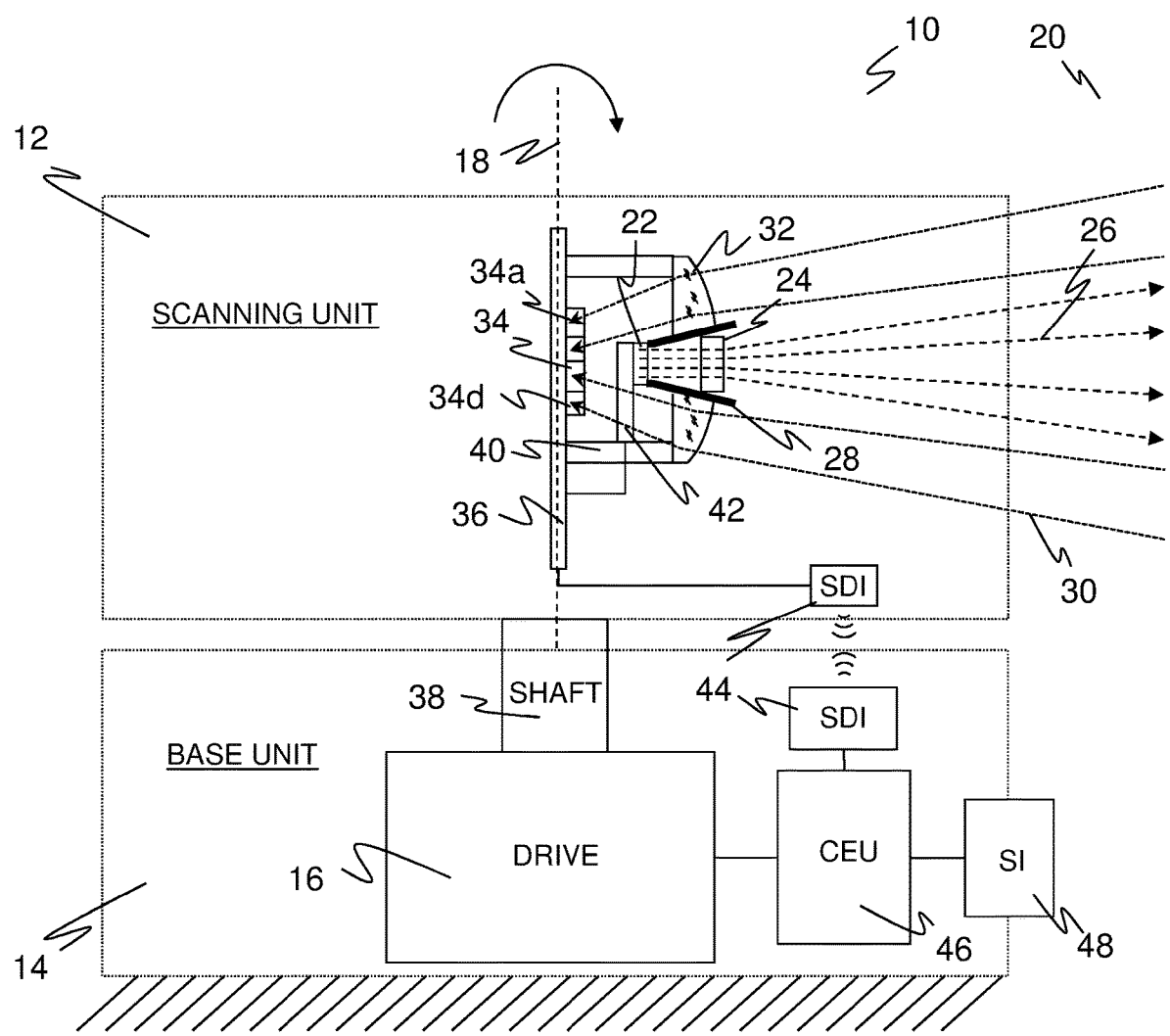
FIG. 1 a sectional representation of an optical sensor configured as a laser scanner.

FIG. 1 shows a schematic sectional representation through an optoelectronic sensor 10 in an embodiment as a laser scanner. The sensor 10 in a rough distribution comprise a movable scanning unit 12 and a base unit 14. The scanning unit 12 is the optical measurement head, whereas further elements such as a supply, evaluation electronics, terminals and the like are accommodated in the base unit 14. In operation, the scanning unit 12 is set into a rotational movement about an axis of rotation 18 with the aid of a drive 16 of the base unit 14 to thus periodically scan a monitored zone 20.

In the scanning unit 12, a light transmitter 22, for example using LEDs or lasers in the form of edge emitters or VCSELs, having a transmission optics 24 generates a plurality of transmitted light beams 26 having a mutual angular offset that are transmitted into the monitored zone 20. To avoid scattered light within the sensor 10, the internal light path of the transmitted light beams 26 can be screened by a light-impermeable tube 28. If the transmitted light beams 26 are incident on an object in the monitored zone 20, corresponding remitted light beams 30 return to the sensor 10. The remitted light beams 30 are led by a reception optics 32 to a light receiver 34. The light receiver 34 has a plurality of reception elements 34a-d and is therefore able to generate a separate electrical received signal from each of the remitted light beams 30. For this purpose, a plurality of photodiodes or APDs (avalanche photodiodes) are conceivable, but also an image sensor having correspondingly associated single pixels or pixel groups. A further conceivable embodiment provides a SPAD (single-photon avalanche diode) receiver having a plurality of SPADs. They have a relatively large reception surface and are therefore well adapted to a beam divergence possibly increased in comparison with single-beam sensors. The arrangement in the light transmitter 22 and in the light receiver 34 is a respective row in the sectional representation of FIG. 1. Alternative two-dimensional arrangements will be explained further below with reference to FIGS. 2 to 4 and 6.

The light receiver 34 is arranged on a circuit board 36 that lies on the axis of rotation 18 and is connected to the shaft 38 of the drive 16. The reception optics 32 is supported by legs 40 on the circuit board 36 and holds a further circuit board 42 of the light transmitter unit 22. The two circuit boards 36, 42 are connected to one another and can also be designed as flexible circuit boards.

The design shown in FIG. 1 with two circuit boards 36, 42 or circuit board regions layered over one another and with a common transmission optics 24 arranged centrally within the reception optics 32 is to be understood purely as an example. Alternatively, any other arrangement known, for example, from one-dimensional optoelectronic sensors or laser scanners would thus per se be possible such as the use of a deflection mirror or beam splitter mirror. A biaxial design instead of the shown coaxial design should be particularly mentioned. In this respect, the light transmitters 22 and light receivers 34 do not lie on a common axis, but beside one another. In a coaxial design, the received light spot becomes larger with smaller distances, with a central region being shaded by the transmission optics 24. With the coaxial design, the received light spot likewise grows with small distances and simultaneously migrates on the connection axis from the light transmitter 22 and the light receiver 34. This dependency on the object distance and on the position of the received light spot also called a triangulation effect can be advantageously exploited.

It is furthermore conceivable to install the light transmitter unit 22 and the light receiver 34 on a common circuit board, also on a common circuit board that only lies in one plane with an arrangement changed with respect to FIG. 1.

A contactless supply interface and data interface (SDI) 44 connects the moving scanning unit 12 to the stationary base unit 14. A control and evaluation unit (CEU) 46 is located there that can at least partly also be accommodated on the circuit board 36 or at another site in the scanning unit 12. The control and evaluation unit 46 controls the light transmitter unit 22 and receives the received signal of the light receiver 34 for a further evaluation. It additionally controls the drive 16 and receives the signal of an angular measurement unit which is not shown, which is generally known from laser scanners and which determines the respective angular position of the scanning unit 12.

The distance from a sensed object is measured for the evaluation, preferably using a time of flight process known per se. Together with the information on the angular position from the angular measurement unit, two-dimensional polar coordinates of all object points in a scanning plane are available after every scanning period with angle and distance. The respective scanning plane is likewise known via the identity of the respective transmitted light beam 26 or of the remitted light beam 30 and its detection site on the light receiver 34 so that a three-dimensional spatial zone is scanned overall.

The object positions or object contours are thus known and can be output via a sensor interface (SI) 48. The sensor interface 48 or a further terminal, not shown, conversely serve as a parameterization interface. The sensor 10 can also be configured as a safety sensor for use in safety engineering for monitoring a hazard source such as a dangerous machine. In this process, a protected field is monitored which may not be entered by operators during the operation of the machine. If the sensor 10 recognizes an unauthorized intrusion into the protected field, for instance a leg of an operator, it triggers an emergency stop of the machine. Sensors 10 used in safety technology have to work particularly reliably and must therefore satisfy high safety demands, for example the standard EN 13849 for safety of machinery and the machinery standard EN61496 for electrosensitive protective equipment (ESPE). The sensor interface 48 can in particular be configured as a safe output device (OSSD, output signal switching device) to output a safety-directed switch-off signal on an intrusion of a protected field by an object.

The sensor 10 shown is a laser scanner having a rotating measurement head, namely the scanning unit 12. A periodic deflection by means of a rotating mirror is alternatively also conceivable. With a plurality of transmitted light beams 26, this has the disadvantage, however, that how the plurality of transmitted light beams 26 are incident into the monitored zone 20 depends on the respective rotational position since their arrangement rotates by the rotating mirror as known geometrical considerations reveal. A further alternative embodiment pivots the scanning unit 12 to and fro, either instead of the rotational movement or additionally about a second axis perpendicular to the rotational movement to also generate a scanning movement in elevation.

The embodiment as a laser scanner is also exemplary. A one-dimensional scanner without a periodic movement is also possible that then practically only comprises the stationary scanning unit 12 having corresponding electronics, but without a base unit 14.

During the rotation of the sensor 10, a respective area is scanned by each of the transmitted light beams 26. A plane of the monitored zone 20 is here only scanned at a deflection angle of 0°, that is with a horizontal transmitted light beam not present in FIG. 1. The remaining transmitted light beams scan the envelope surface of a cone that is designed as differently acute depending on the deflection angle. With a plurality of transmitted light beams 26 that are deflected upward and downward at different angles, a kind of nesting of a plurality of hourglasses arises overall as a scanned structure. These areas are here also sometimes called scanning planes in simplified terms.

Figure 2A:
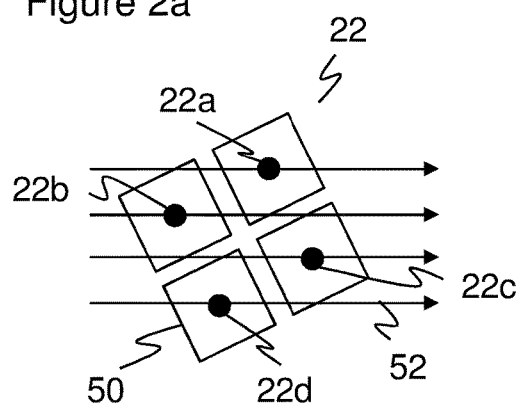
FIG. 2a a schematic representation of an exemplary transmitter arrangement in a rotated matrix for generating an equidistant scanning.

FIG. 2a shows a schematic representation of, for example, four transmission elements 22a-d that are arranged to form a square. The transmission elements 22a-d are each surrounded by a housing 50. The housing 50 bounds the density with which transmission elements 22a-b are arranged with respect to one another. As can be seen, a considerably more compact arrangement can be achieved by a two-dimensional arrangement instead of a row arrangement.

The square of the transmission elements 22a-d is rotated by a suitable angle of, in this case, 26.57° so that against initial intuition equidistant scanning planes with which the monitored zone is detected at a uniform angular resolution are also generated without a row arrangement. This is indicated by arrows 52 that represent the scan lines and are equidistant and parallel. The arrows 52 stand perpendicular with respect to the axis of rotation and also form the reference for the angle by which the square is rotated.

Figure 2B:
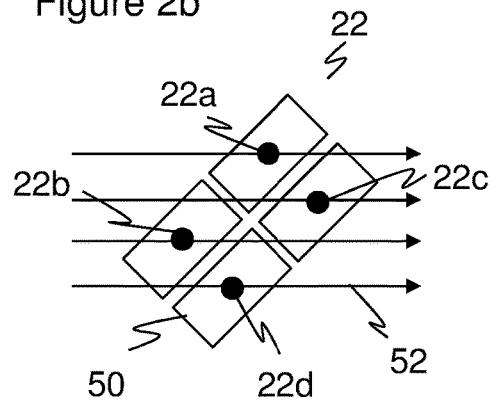
FIG. 2b a schematic representation of an exemplary alternative transmitter arrangement in a rotated matrix for generating an equidistant scanning.

FIG. 2b shows a further example. Unlike FIG. 2a, the four transmission elements 22a-d are here arranged instead of forming a square to form a rectangle with a side aspect ratio of 2:1. If the angle is now adapted to 45°, equidistant scanning planes can be fully equivalently generated thereby.

Figure 3:
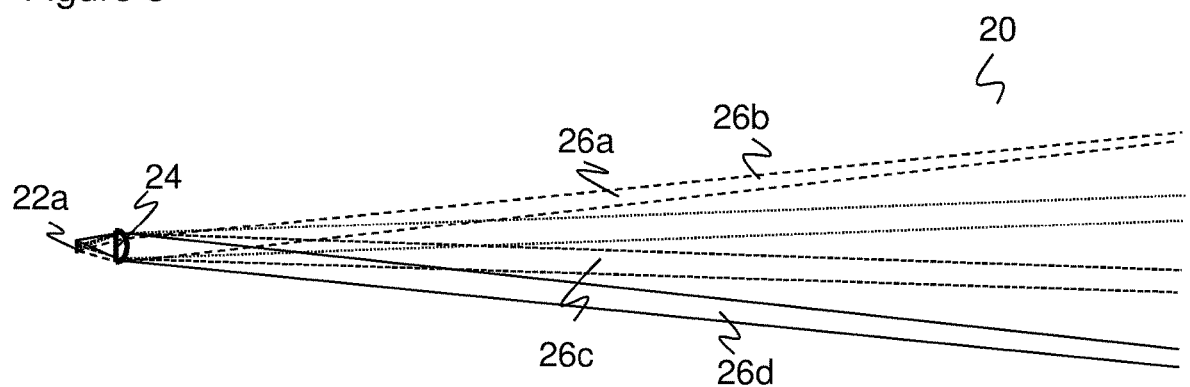
FIG. 3 an exemplary representation of the beam progression through a transmitter arrangement in accordance with FIG. 2a or 2b.

FIG. 3 shows the four resulting transmitted light beams 26a-d in a sectional representation. They have the same angular distance from one another, as desired. An additional distance in the direction of rotation, here therefore perpendicular to the paper plane, does not play any role for the measurement result and could be compensated in the evaluation.

Figure 4:
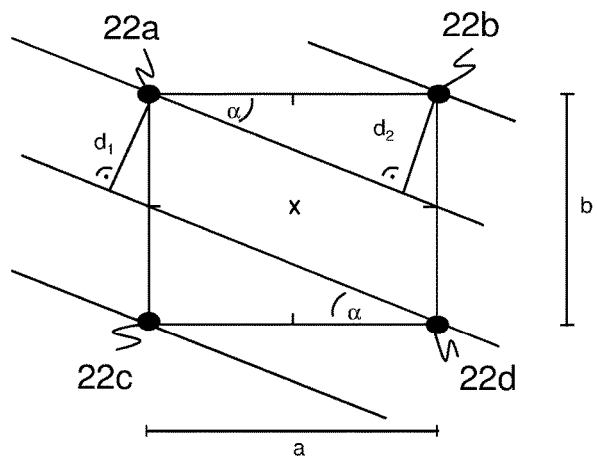

FIG. 4 is a geometrical sketch on the basis of which the calculation of the angle α is explained by which the arrangement of the transmission elements 22a-d is rotated in FIGS. 2a-b. With reference to the variables shown in FIG. 4, the angle α is sought for which the beams in accordance with the arrows 52 have the same distance from one another; $d_1=d_2$ should thus apply. According to the intercept theorem, this is equivalent to the vertical side of the arrangement being centrally divided. The relationship tan $$\alpha = \frac{b}{2a}$$

consequently applies in the right-angled triangle to the two adjacent sides at the transmission element 22b. In the quadratic arrangement of FIG. 2a a=b and thus $$\alpha = \arctan\frac{1}{2} = 26.57°.$$

In the rectangle having a side aspect ratio of 2:1 of FIG. 2b 2a=b and α=arctan 1=45°.

The examples in FIGS. 2 to 4 each show four transmission elements 22a-d. The invention is not restricted to a specific number. The angle is calculated for any desired n×m matrix arrangement in that the respective vertical side of the arrangement is no longer divided at ½, but is rather in a different ratio that is given by the number and arrangement of transmission elements 22a-d. There is also a matching angle here due to the regularity. Alternatively to a calculation, the angle can also be found by trying different rotational positions. It is admittedly advantageous due to the uniform measurement resolution to select the measurement planes as equidistant by a matching angle, but it is possible to directly deviate from this in different embodiments. Different 2D arrangements than a matrix are anyway also possible. They include arrangements that are still based on a matrix, for instance in that only some outer transmitted light beams 26 are added to a matrix or in that the density of the matrix decreases toward the outside, but also a general 2D arrangement.

The same applies accordingly to the arrangement of the reception elements 34a-d. In addition, the shape and size of the reception elements 34a-d can be varied for a further adaptation, for example with angular reception elements.

The basic arrangement in the sensor 10 is that a respective transmission element 22a-d transmits a transmitted light beam 26 that is incident as a remitted light beam 30 onto a reception element 34a-d. Each reception element 34a-d is thus associated with a specific transmitted light beam 22a-d and thus also to a transmission element 26a-d provided that the transmitted light beams 22a-d are not first created by splitting in the transmission optics 24. As already explained above, the reception light spot migrates in a biaxial design depending on the distance of the object on the light receiver 34 and increases in size in a coaxial design. The reception light spot is thereby no longer incident with near distances on the associated reception elements 34a-d of the basic arrangement.

The invention now makes use of the fact that there are adjacent reception elements 34a-d in the arrangement of the reception elements 34a- to which the reception light spot migrates. Reception elements 34a-d that are actually not responsible for a specific transmitted light beam 22a-d therefore act as additional near region detectors of the responsible reception element 34a-d. In principle, it is also conceivable to provide more reception elements 34a-d than transmission elements 22a-d for this, but this requires additional effort.

The plurality of transmission elements 22a-d of the light transmitter 22 or the plurality of receiver elements of the light receiver 34 could be operated simultaneously to achieve a measurement repetition frequency that is as high as possible. A multiplex operation is provided instead in an advantageous embodiment. For example, the transmission elements 22a-d and the respectively associated reception element 34a-d are activated cyclically pairwise after one another in time to respectively evaluate a monitoring beam. To obtain additional near region detectors, at least one further reception element, preferably an adjacent reception element, is also activated, i.e. its received signal is read out and evaluated, in addition to the associated reception element 34a-d for at least one transmission element 22a-d during its activity.

Multiplex operation has a plurality of advantages. On the one hand, it is possible in this manner to unambiguously associate the transmission element 22a-d and thus the monitoring beam which a received signal belongs to. In addition, the sensor 10 manages in this manner with considerably fewer electronic components since, for example, driver stages of the transmission elements 22a-d and amplifier stages or filter stages of the reception elements 34a-d can be used multiple times by means of multiplexing. The power consumption and waste heat are thereby also reduced.

Figure 5:
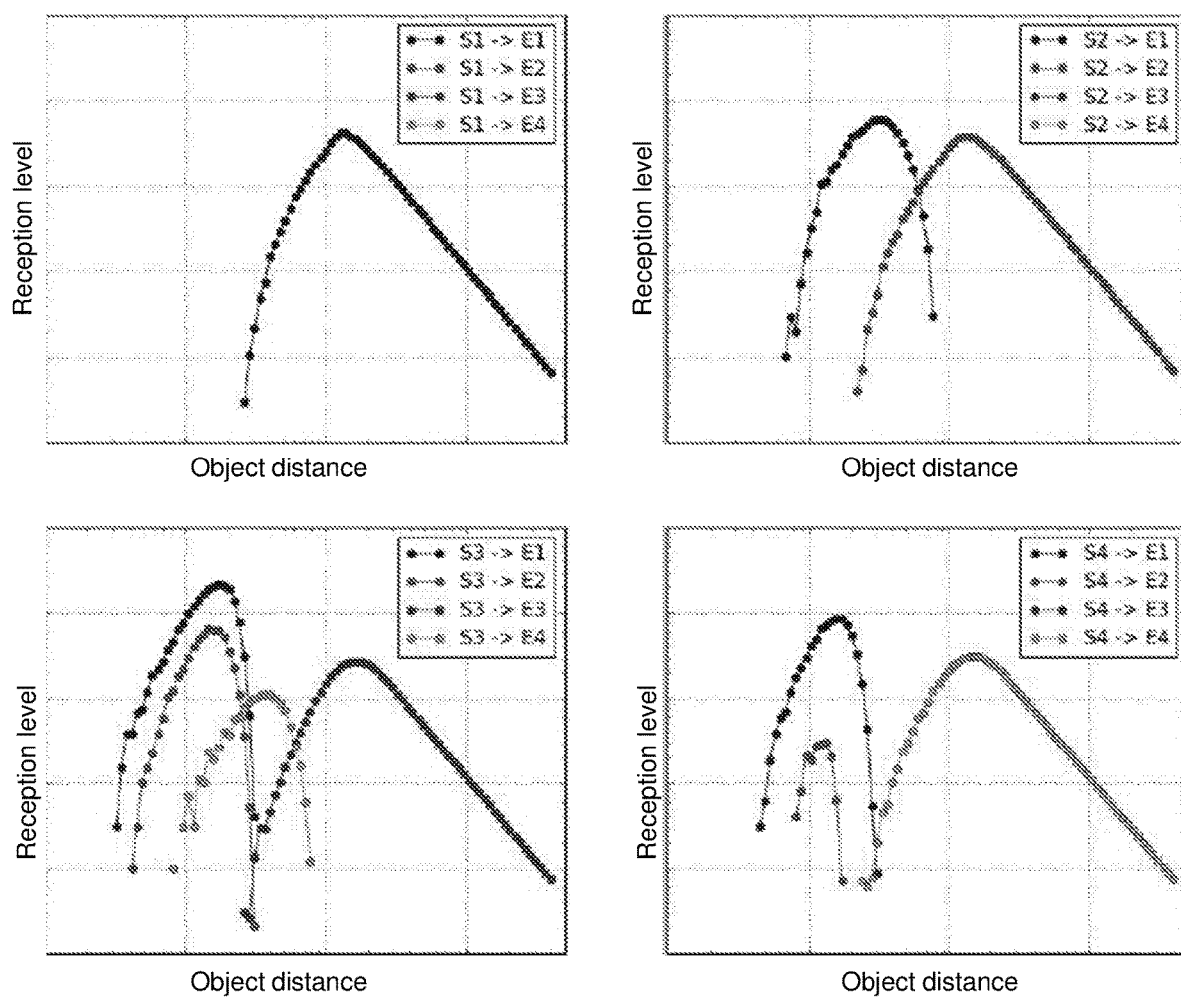
FIG. 5 exemplary received signals for light receivers with a transmitter arrangement in accordance with FIG. 2b and with a corresponding receiver arrangement.

FIG. 5 shows examples of the received signals on the reception elements 34a-d of an arrangement of four corresponding to FIG. 2b. In this respect, only one respective transmission element 22a-d transmits in the four individual representations, as indicated in the legend. The respective received signals on all four reception elements 34a-d are shown in the form of the intensity in dependence on the object distance. The arrangement of the light transmitters 22 and light receivers 34 is biaxial here. The distance-dependent migratory movement of the received light spot takes place on the axis between the light transmitter 22 and the light receiver 34 and therefore has a very different effect on the individual reception elements 34a-d. Not all the reception elements 34a-d have a neighbor in the relevant direction. The light of the first transmission elements 22a is therefore, for example, as shown at the top left, only registered on the first reception element 34a. In contrast, actually all of the remaining reception elements 3a-b, 34d detect the light of the third transmission element 22c in the near region in addition to the associated third reception element 34c in the intermediate and far regions. At least one of these reception elements 34a-b, 34d can therefore act as an additional near region detector.

There are therefore reception elements 34a-d in a position suitable for near region detection at least for one transmission element 22a-d. With a biaxial design, suitable neighbors are located on or close to the connection axis of the light transmitter 22 and the light receiver 34 in the direction away from the light transmitter 22 since the received light spot migrates in this direction with near objects. With a coaxial design, they are neighbors in the periphery to detect the received light spot that increases in size in the near region.

It is only a seeming disadvantage that not all the monitoring beams can be evaluated using additional near region detectors. In the near region, the monitoring beams are anyway very dense so that the gain in measurement resolution through multiple scanning would be very small.

The specific evaluation of the plurality of received signals can take place in different manners. It is very simple to form a sum signal directly at the start. Alternatively, the received signals are compared and, for example, only the strongest received signal is evaluated. A further example is to evaluate the received signals individually, for instance to determine times of flight, and to make a comparison, to average, or to allocate in another manner at this level of these results.

In an embodiment, the local distribution of the received light over the plurality of active reception elements 34a-d is evaluated in addition or alternatively to the extension of the level curve in the near region. A distance is here estimated from the position of the received light spot in accordance with the triangulation principle. This distance is only rough depending on the number of active reception elements 34a-b, but can at least be used for validation and as an estimated value for the event that a time of flight measurement is not implemented or does not currently deliver any measured value. The distance resolution can also be refined by increasing the number of reception elements 34a-d.

A further degree of freedom of the arrangement of the transmission elements 22a-d and reception elements 34a-d should still be explained with reference to FIG. 6, namely the direction in which the reception elements 34a-d are disposed with respect to the arrangement of the transmission elements 22a-d. This is designated by a further angle β and suitable proximity relationships for reception elements 34a-d acting as near region detectors can be provided by its selection.

Figure 6A:
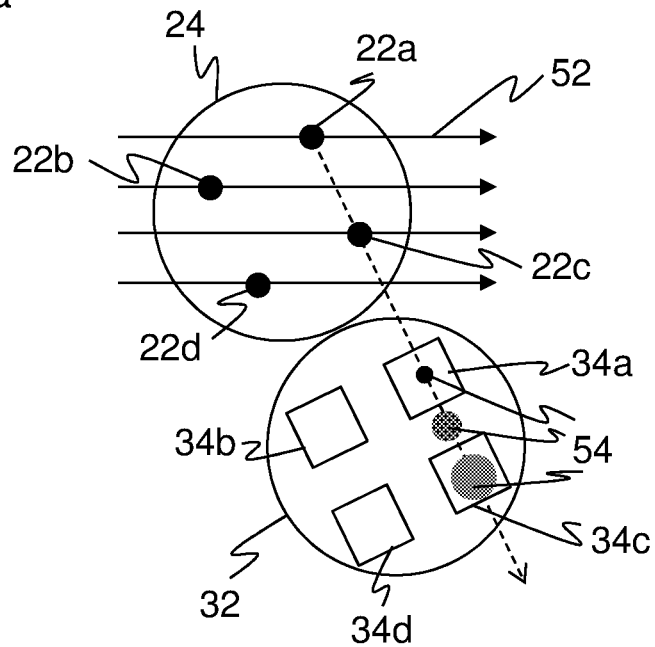
FIG. 6a a schematic representation of a transmitter arrangement in accordance with FIG. 2b with a similar receiver arrangement without mutual rotation offset therefrom.

FIG. 6a shows a first example where β=0. The columns of the matrix arrangement of the reception elements 34a-d are in a direct extension of the transmission elements 22a-d, that is they form common columns. The received light spot 54 consequently migrates in the column direction. The reception element 34c is here suitable as a near region detector for the transmitted light beam of the transmission element 22a in addition to the associated reception element 34a, accordingly reception element 34d to reception element 34b. This selection of β is therefore advantageous since it provides direct proximity relationships even for a plurality of reception elements 34a-d.

Figure 6B:
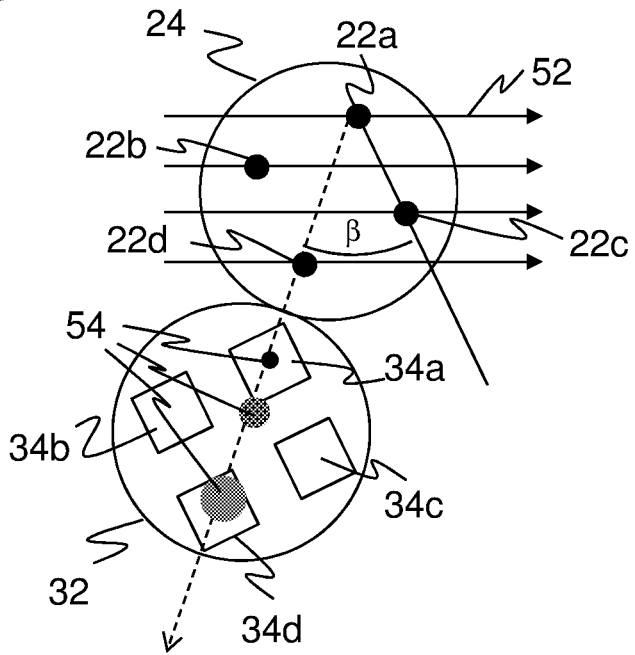
FIG. 6b a schematic representation similar to FIG. 6a, but with mutual rotation by 45°.

FIG. 6b shows a further example where β=45°. The main diagonals of the arrangements of transmission elements 22a-d and reception elements 34a-d are now aligned with one another and the reception element 34d at the bottom on the diagonal is suitable as a near region detector for the reception element 34a at the top on the diagonal. The two examples illustrate the above general statements that near region detectors can be found on the connection axis between the light transmitter 22 and the light receiver 34 in the direction away from the light transmitter. The two examples for β show an advantageous choice so that reception elements 34a-d are also actually located at the positions designated in this manner. Other sensible proximity relationships can, however, also be designed with a suitable β for different arrangements of transmission elements 22a-d and reception elements 34a-d. It must be mentioned for reasons of completeness that an arrangement where β=45° was used as the basis for the exemplary received signals of FIG. 5.

The invention claimed is:

1. An optoelectronic sensor for detecting an object in a monitored zone, comprising:
   at least one light transmitter for transmitting a plurality of mutually separated transmitted light beams;
   a plurality of light receivers that are each associated with one of the transmitted light beams for generating a received signal from the associated light beam remitted at the object;
   an additional light receiver for receiving one of the light beams remitted by the object at a reception light spot that at least partially misses being received by an associated one of the plurality of light receivers; and
   an evaluation unit that is configured to acquire information on the object at the respective point of incidence of the transmitted light beam from the received signal of the light receiver that is associated with the transmitted light beam,
   wherein the evaluation unit is further configured to additionally consider at least one received signal of a light receiver that is not associated with the transmitted light beam on the acquiring of information on the object at the point of incidence of at least one transmitted light beam, such that the additional light receiver contributes to the acquiring of the information on the object for near range detection thereof.

2. The optoelectronic sensor in accordance with claim 1, wherein the evaluation unit is configured to determine a distance of the object from a time of flight between the transmission of the transmitted light beams and the reception of the remitted light beams.

3. The optoelectronic sensor in accordance with claim 1, that is configured as a laser scanner and has a movable deflection unit with whose aid the transmitted light beams are periodically guided through the monitored zone and thus form a plurality of scanning planes, wherein the deflection unit is configured in the form of a rotatable scanning unit in which the light transmitter is accommodated.

4. The optoelectronic sensor in accordance with claim 1, wherein the arrangement of the light receivers forms a two-dimensional pattern.

5. The optoelectronic sensor in accordance with claim 4, wherein the transmitted light beams form a two-dimensional pattern in cross-section.

6. The optoelectronic sensor in accordance with claim 5, wherein the transmitted light beams form the same two-dimensional pattern, except for scaling, as the arrangement of the light receivers.

7. The optoelectronic sensor in accordance with claim 5, wherein the direction in which the reception elements are disposed with respect to the arrangement of the transmitted light beams is rotated by an angle.

8. The optoelectronic sensor in accordance with claim 5, wherein the two-dimensional pattern of the light receivers and/or the two-dimensional pattern of the transmitted light beams has/have a matrix arrangement.

9. The optoelectronic sensor in accordance with claim 8, wherein the matrix arrangement is slanted.

10. The optoelectronic sensor in accordance with claim 9, wherein the matrix arrangement is slanted by an angle at which the scanning planes are arranged equidistantly from one another.

11. The optoelectronic sensor in accordance with claim 1, wherein the evaluation unit is configured to activate the light transmitters and the light receivers after one another in a multiplex process, with the respective associated light receiver being active during the transmission of a transmitted light beam and with at least one further light receiver that is not associated with the transmitted light beam additionally being activated for at least one transmitted light beam.

12. The optoelectronic sensor in accordance with claim 1, wherein the evaluation unit is configured to individually evaluate the received signal of the light receiver associated with the transmitted light beam and the at least one additionally considered received signal to compare or allocate the results or to form a common signal therefrom and to evaluate it.

13. The optoelectronic sensor in accordance with claim 1, wherein the evaluation unit is configured to evaluate the received signal of the light receiver associated with the transmitted light beam and the at least one additionally considered received signal in accordance with the triangulation principle for a distance estimate.

14. The optoelectronic sensor in accordance with claim 1, wherein a common reception lens is arranged upstream of the light receivers.

15. A method for detecting an object in a monitored zone comprising the steps of:
transmitting a plurality of mutually separated light beams into the monitored zone, such that the light beams are remitted by the object;
receiving the remitted light beams in a light receiver respectively associated with the transmitted light beam to generate a respective received signal;
receiving one of the light beams remitted by the object at a reception light spot that at least partially misses being received by an associated one of the plurality of light receivers at an additional light receiver;
acquiring information on the object at a plurality of sites of incidence of the transmitted light beams from the received signals; and
additionally considering in the acquiring of the information at least one received signal of a light receiver that is not associated with the transmitted light beam at at least one site of incidence of a transmitted light beam, such that the additional light receiver contributes to the acquiring of the information on the object for near range detection thereof.

* * * * *